Nov. 24, 1959 L. G. THOMPSON ET AL 2,914,729
MAGNETIC UNIT TURNS TESTER
Filed Jan. 17, 1955 3 Sheets-Sheet 1
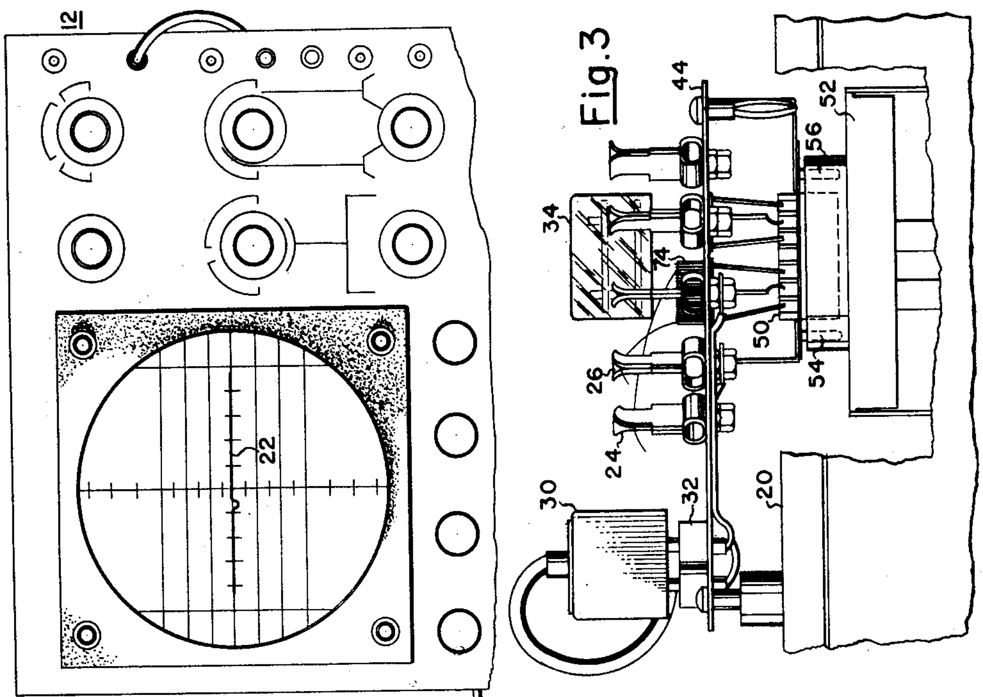
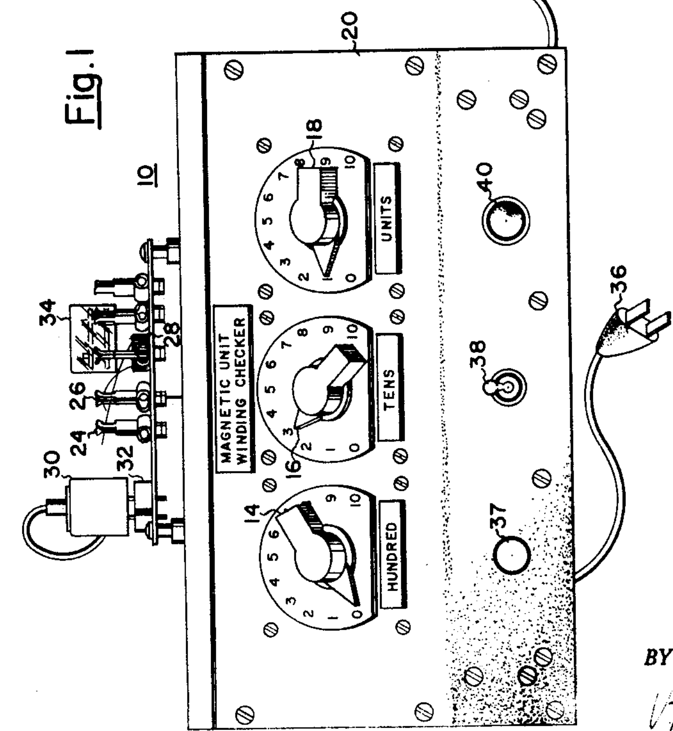
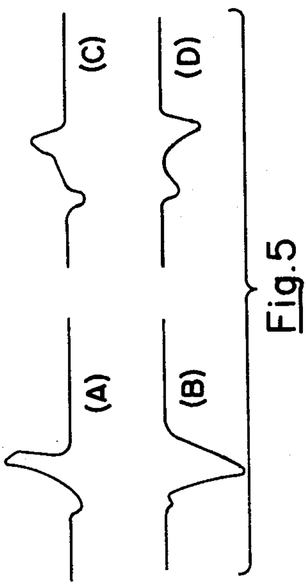
INVENTORS
LYLE G. THOMPSON
ROBERT H. MURCH
BY
Raymond B. Parker
ATTORNEY Nov. 24, 1959 L. G. THOMPSON ET AL 2,914,729
MAGNETIC UNIT TURNS TESTER
Filed Jan. 17, 1955 3 Sheets-Sheet 2
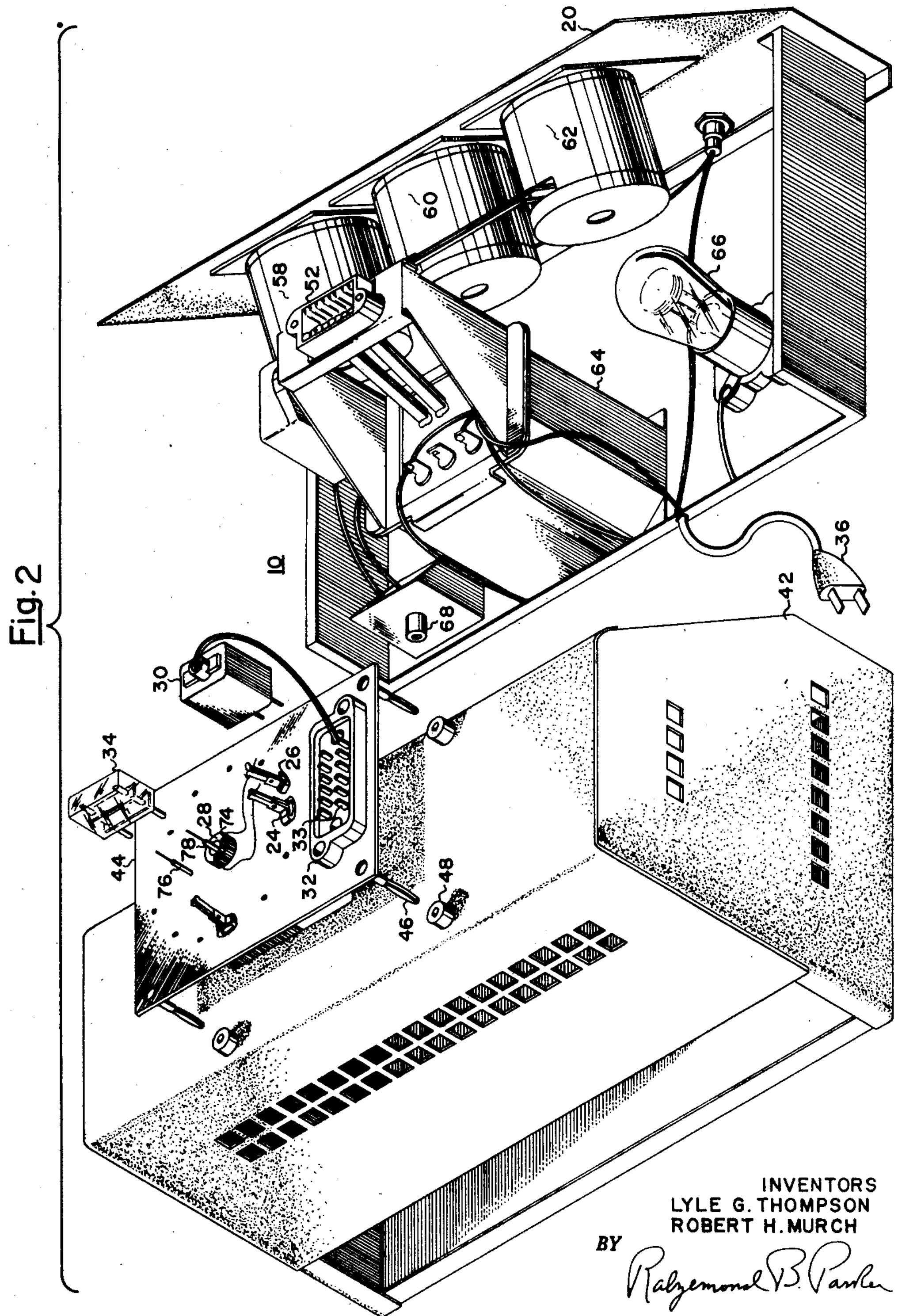
INVENTORS
LYLE G. THOMPSON
ROBERT H. MURCH
BY Raymond B. Parker
ATTORNEY MAGNETIC UNIT TURNS TESTER
Filed Jan. 17, 1955 3 Sheets-Sheet 3
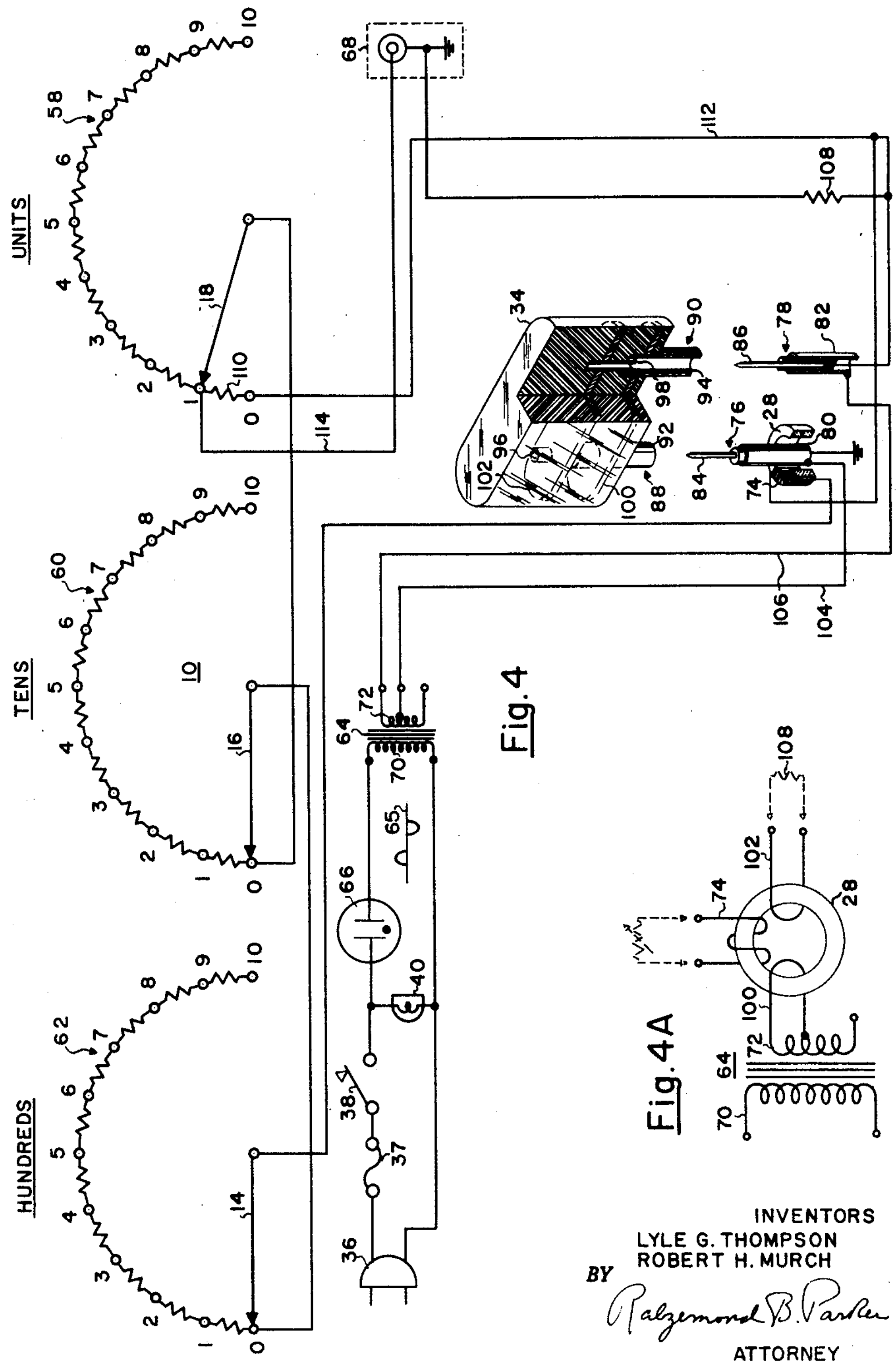
INVENTORS
LYLE G. THOMPSON
ROBERT H. MURCH
BY Ralzemond B. Parker
ATTORNEY United States Patent Office 2,914,729

Patented Nov. 24, 1959

2,914,729

MAGNETIC UNIT TURNS TESTER

Lyle G. Thompson, Broomall, and Robert H. Murch, Springfield, Pa., assignors to Burroughs Corporation, Detroit, Mich., a corporation of Michigan Application January 17, 1955, Serial No. 482,166

13 Claims. (Cl. 324—55)

This invention relates to a method of and apparatus for testing magnetic materials and more specifically for testing or checking to determine the exact number of winding turns on a bistable state magnetic switching element.

Windings may be placed about magnetic elements with automatic winding machines which also include counting devices controlled by the operator which indicate the approximate number of turns on the windings. However, because the operator must be relied upon for an accurate count it is difficult to maintain a precise number of turns upon mass produced magnetic elements. It is imperative in many instances that the magnetic units have the exact number of turns specified or the equipment containing them will furnish erroneous signals. This is especially true when the magnetic unit has a small number of turns and the proportion of one more or less turn to the total number of turns is relatively high. In many instances, magnetic units are in the form of toroidal or ring-like configurations having a small outer diameter in the order of one-eighth of an inch and a multiplicity of windings. Some magnetic units employ a tapped winding having a total number of turns in the order of 10 to 15 turns, which must be balanced on either side of the tap. Thus, one turn more or less may be the difference between reliable and unreliable operation. It is very difficult and time consuming to check even a small number of turns on the windings by hand, and resistance measurements of windings have also proven to be impractical because of the low winding resistance of one or two turns. It is readily apparent that once the magnetic cores are installed in their equipment the task of locating trouble caused by the improper number of turns on the windings is difficult especially when a large number of magnetic cores are utilized as in such equipment as magnetic core matrix memories and the like. By checking the number of turns on a magnetic component before inserting it into the equipment, it is possible to reduce sources of error. Accordingly, it is desired to provide a simplified method of and apparatus for rapidly determining the exact number of turns on a magnetic unit.

It is, therefore, the general object of the invention to provide an improved method of and apparatus for checking the number of turns on a magnetic unit.

It is another object of the invention to test the number of turns about a bistable state magnetic switching element.

It is a further object of the invention to provide an improved method of changing the storage state of a bistable magnetic element under test, such method being particularly valuable in carrying out tests to determine the number of turns of a winding in said magnetic element.

These and other objects are accomplished in one embodiment of the invention by switching a magnetic unit under test from one bistable state to another to generate a fixed amount of flux for a given input potential and a particular core configuration. In other words, the bistable type of ferromagnetic core in the magnetic unit is changed from one predetermined magnetic flux density state to a similar flux density state but of opposite sense or polarity. The alternation in the magnetic flux involved in this switching of the core generates a voltage in the winding being tested and having an unknown number of turns. A test or comparison winding of a known number of turns is magnetically coupled to the magnetic unit while under test to generate a standard testing current or comparison potential in response to switching of the unit. The test unit winding, with the unknown number of turns, is connected across a first impedance network arranged to receive the voltage generated therein. The network, which may be a resistance network, is arranged in multiple sections which are selectively varied to adjust the switching current flowing in the network. The test winding with the known number of turns is placed across a fixed, or standard, impedance to generate a standard comparison current or output comparison pulse. The standard output impedance is arranged in opposition to or in a voltage differential relationship with a portion of the impedance network through which the aforementioned switching current passes. Thus, the exact number of turns is determined by manipulating the amount of impedance of that part of the network through which the switching current passes until the voltage differential is at a minimum or zero null position which is detected by an indicating device connected across both the standard impedance and the aforementioned portion of the selectively adjustable network. The calibration of the adjustment is arranged so that the exact number of turns may be read directly from the correct combination of the settings for providing a null indication.

Other objects and features of advantage of the present invention will be found throughout the following more detailed description of the invention, particularly when considered with the accompanying drawings in which like reference characters refer to similar elements.

Fig. 1 is a front elevation view of the magnetic unit winding checker and an associated indicating device connected thereto in accordance with the invention;

Fig. 2 is an exploded isometric view of the magnetic unit winding checker constructed in accordance with the invention;

Fig. 3 is an enlarged front elevation of a part of the winding checker with a portion of the housing broken away to show the structural details of the test portion of the circuit and its inter-relationship with the electrical circuitry;

Fig. 4 is a diagrammatic representation of the electrical circuit of the magnetic unit tester with a portion of the circuit structure illustrated in exploded perspective;

Fig. *4a* is a simplified diagrammatic representation of a part of the circuit of Fig. 4; and Fig. 5 is a graphical illustration of typical waveforms that may result during the testing operation.

Referring now more specifically to the construction shown in Fig. 1, there is illustrated the magnetic unit winding checker 10 connected to an associated indicating device, in this instance the cathode ray oscilloscope 12. The oscilloscope 12 is utilized to give an indication or display of the balance condition sought through the current combination effected by manually operable selector dials 14, 16 and 18 mounted on the front panel 20 of the checker device and further identified as the hundreds, tens and units dials. The correct combination of selector dials gives a direct reading of the number of turns on the coil winding under test. The oscilloscope 12 gives a visual indication of the balance condition which may be illustrated on the face of the instrument by a resultant signal similar to the trace 22.

The magnetic unit winding checker 10 is further designed to receive a multi-winding magnetic component and to check the number of turns on each winding thereon. The winding checker 10 exhibited in Fig. 1 is designed to test as many as six separate windings on a magnetic unit. Each of the windings under test may be coupled or connected to a pair of the clip-like members 24 and 26 as more readily evident from the illustration of Fig. 2, wherein the magnetic unit 28 provided with a single winding 74 is shown for simplicity of illustration. The different windings of a multi-turn coil may be selected and tested by means of the winding selector plug 30 and its associated female member 32 positioned on the left hand top portion of the checker 10 as illustrated in Fig. 1. Each of the pairs of clip-like members 24 and 26 correspond to a pair of similarly identified pair of female receptacles such as 33 on the female member 32 so that the selection of the winding under test is simplified.

The remaining member to be positioned in preparation for the actual testing operation is the test winding member 34. The test winding member 34 is illustrated in its connected position in Fig. 1 when the conductors contained in the member are magnetically coupled to the magnetic unit 28. In Fig. 2 the test winding member is disconnected to allow removal of the magnetic unit 28. The details of the member 34 and its operative relationship in the testing circuit will be explained more fully hereinafter. The winding checker 10 may be supplied from a conventional 110 volt, 60 cycle power outlet by means of the power plug 36. The power for the checker is controlled by the on-off switch 38, and the on-position may be indicated by a conventional indicator lamp 40. The oscilloscope 12 may also be connected to a conventional source of power and is also connected to the winding checker 10.

Now referring more specifically to Figs. 2 and 3, structural details of the checker assembly and operation will be described. The front panel 20 of the checker 10 is illustrated in Fig. 2 removed from its associated back housing 42 to which it is normally secured. In the illustrated embodiment of the invention, an exposed core testing area is provided in the form of a supporting platform 44 removably positioned by plugs 46 and sockets 48 on the top of the housing 42. The electrical lead wires associated with the platform 44 are arranged underneath, as better viewed in the detail view of Fig. 3. The various elements supported by the platform 44 are electrically connected to a male connecting member 50 which extends through an aperture in the top section of the housing 42 to mate with the female receptacle 52. A pair of pin-like guide members 54 and 56 assure registration of plug members 50 and 52. Three decade resistance units manually variable by means of the dials 14, 16 and 18 of Fig. 1 are identified by the reference characters 58, 60 and 62. A current transformer 64 and a glow discharge device 66 are also provided and a plug 68 serves to couple an indicating device to the checking unit.

The circuit operation of the magnetic unit winding checker 10 is described in connection with the diagram of Fig. 4. The primary coil 70 of the current transformer 64 is energized from plug 36 by means of the series arrangement of the fuse 37, the closed on-off switch 38 and the glow discharge device 66. The indicating lamp 40 is connected across the power line to identify the position of switch 38. The low discharge device 66 may be a neon lamp, and is arranged in the circuit of the primary coil 70 to convert the input alternating current to a non-sinusoidal input as shown in the accompanying waveform 65. The neon lamp 66 is a bilateral device so that pulses of alternate polarity are produced. The transformer secondary coil 72 thereby is provided with alternating and intermittent pulses of enough amplitude to switch the magnetic unit 28. The alternating intermittent input is thus simply provided without complex circuitry and it has been found that an inexpensive two watt neon lamp is acceptable. Other devices to provide the desired current input into the primary coil could be used, however, such as non-linear resistances or relay operated contacts to control the current flow. Should the 60 cycle input be utilized directly without the glow discharge tube, excessive current flows in the secondary winding 72 and the magnetic unit test winding connected thereto.

As previously mentioned, the magnetic unit 28 being checked is illustrated for simplicity with a single winding 74 having an unknown number of turns. The magnetic unit is of a toroidal or ring-like configuration having a bistable storage characteristic of the type described in the article by An Wang entitled "Magnetic Triggers" in the June 1950 issue of the Proceedings of the I.R.E., pages 626–629. Due to its bistable nature the magnetic unit 28 when switched from one stable state to the other produces a fixed quantum of switching flux. The amount of flux is determined primarily by the core material and dimensions and is seen from the aforesaid article to be the difference in flux between a remanent flux (on a horizontal portion of the hysteresis loop B–H curve) tending to approach a saturation flux value in one sense and a remanent flux similarly tending to approach a saturation flux value in the opposite sense; this marked change of flux or switching of the core also is seen to occur rapidly as the switching current reaches magnitudes in the neighborhood of the coercive force for the core. The input energy to the primary 70 is therefore arranged to provide sufficient energy to intermittently switch the magnetic unit 28 from one stable flux density state to the other and alternately back to the first-mentioned state.

The test winding member 34 provides return circuits for additional coils in the form of a single primary turn and a single secondary turn which are coupled to the magnetic unit 28 under test by means of the pair of conductive plug members 76 and 78. The plugs 76 and 78 are each coaxial conductors with outer elements 80 and 82 respectively and central conductive pin elements 84 and 86 respectively. The test winding member 34 has a pair of plug receptacles 88 and 90 having generally tubular outer members 92 and 94 arranged to mate only with the corresponding male sections 80 and 82 respectively. Similarly, insulated from the tubular members 92 and 94 are the inner tubular members 96 and 98 of a smaller diameter to contact only the pin members 84 and 86. The outer tubular members 92 and 94 are electrically connected by the conductive member 100 to form with the outer elements 80 and 82 a first test winding for inclusion in an exciting circuit, while the inner tubular members 96 and 98 are shorted together by a further conductive member 102 to form with the central pin elements 84 and 86 a second test winding for use as a comparison or standard potential coil or circuit. The entire assembly 34 is molded into an insulating material to form a removable member for permitting access to the toroidal magnetic unit 28.

When the magnetic unit 28 is placed around one of the members 76 or 78, as seen in Fig. 2, the end terminals of the winding 74 under test may be connected to the clips 24 and 26 for functional operation in the decade resistance network of the winding checker circuit. Upon positioning the test winding member 34 into contact with the conductive plug members 76 and 78 a single turn primary and single turn secondary loop is thereby coupled to the magnetic unit 28. The outer male elements 80 and 82 in this instance are connected to two terminals of the transformer secondary coil 72 by means of the respective lead wires 104 and 106 and thereby form a single turn primary winding about the magnetic switching unit 28. The inner male elements 84 and 86 along with the conductive member 102 provide a single turn secondary loop 102 about the switching unit 28 which is connected across resistor 108. This part of the electrical circuit is more simply represented in Fig. 4*a*.

To provide a comparison potential pulse from the single turn secondary 102, a preselected imepdance or known resistance is connected across the winding. Thus, a 100 ohm resistor 108 may be used. The resistor 108 at the inner conductive element 84 is grounded to form a reference potential for an indicating device at terminal 68. The ungrounded end terminal of resistor 108 is further connected to the first resistance step 110 of the "units" decade resistance 58 by means of the lead wire 112. The decade resistance unit 58 in this instance is a 1000 ohm total resistance in ten steps which are provided with taps at the 100 ohm positions. The opposite end terminal of the resistance step 110 is connected to the lead wire 114 and connected to the outlet 68 provided for the indicating device so that the resultant voltage across resistors 108 and 110 is supplied. The selector arm 18 provided with the decade resistance 58 is connected to one end terminal of the "tens" decade resistance unit 60 which consists of a series of 1000 ohm resistance units connected between the taps. The selector arm 16 provided for the decade unit 60 is similarly connected to an end terminal of the "hundreds" decade unit 62. The "hundreds" decade 62 consists of 10,000 ohm resistance sections connected between the taps. The selector arm 14 of the latter decade unit is connected to one end terminal of the winding 74 under test. The remaining end terminal of winding 74 is connected to the aforesaid ungrounded end terminal of the resistor 108 and thereby is connected through the lead 112 into the "units" decade resistance 58. Thus the decade resistor arrangement 58, 60, 62 constitutes an adjustable impedance element coupled across the winding 74 under test and made up of a plurality of impedance portions or resistance sections selectable by the usual decade adjustments in predetermined combinations to provide any one of a progression of impedance values differing each from the next by equal impedance increments, specifically 100 ohm resistance increments.

When the unknown winding 74 is connected across that part of the decade resistance network selected by positioning of the selection arms 14, 16 and 18 current flows in the circuit as a result of the voltage generated in the winding 74 during the switching operation of the magnetic unit 28 under test. Since this quantum change of flux generates a voltage in the single turn secondary having a fixed 100 ohm load it may be referred to as a standard pulse. The fixed load or in this instance the resistor 108 is arranged to develop a voltage in opposition to the pulse provided by the resistor 110 in the decade resistance network due to switching current flowing from winding 74. By setting the decade resistance units 58, 60 and 62 to provide a voltage pulse across resistor 110 (which thus constitutes a reference impedance unit included in each of the predetermined combinations or settings of the adjustable decade impedance element and having an impedance value equal to an integral number of the aforementioned 100 ohm impedance increments) equal and opposite to the standard voltage pulse provided by resistor 108 the number of turns on winding 74 is set up on the calibrated decade unit dials. An indicator device such as the oscilloscope 12 of Fig. 1 may be utilized to detect the balance condition. Waveforms such as illustrated in Fig. 5 are typical of various displays that an operator of the magnetic unit winding checker may observe during the testing procedure. Fig. 5(A) shows a typical waveform representative of an improper setting of the decade units so as to be off the balance condition on one side, while the waveform of Fig. 5(B) indicates unbalance in the opposite direction. Similarly, the illustrations of Figs. 5(C) and 5(D) represent typical waveforms as the true number of turns is approached from both directions. The balance condition of minimum voltage may be represented by a waveform 22 on the face of the oscilloscope 12 as previously mentioned, and should be a straight line for the null balance condition. Upon reaching this latter condition the correct number of turns of the winding under test may then be read directly from the settings of the selector arms of the decade units. Thus it will be seen that the null voltage indicator indicates when the selected impedance value of the adjustable decade impedance element bears the same ratio to the impedance of the reference unit 110 of the decade impedance as the number of turns in the given coil 74 bears to the number of turns in the standard or comparison coil made up of the conductors 84, 96, 102, 98, and 86. If the magnetic unit has several windings, the succeeding winding may be checked by changing the position of the plug member 30. Also other magnetic units may be checked in different plug positions by the insertion of a series of magnetic units upon the conductive member 76 or 78. The magnetic unit winding checker herein above described has been utilized to check magnetic units up to 300 turns to the exact number with this method. Magnetic units having more than 300 turns have also been checked with an accuracy of approximately ±1%. Thus it will be understood by those skilled in the art of magnetic and electric circuits that, when this specification or the appended claims refer to an indication of a number of turns or of a ratio of turns, this indication may not give the exact number of turns when the winding under test contains a great many turns.

It should be noted that as a result of the use of the first resistance step of the units decade resistance 58 the selector arm 18 must be maintained with the "one" position connected. Therefore, when a 10 turn winding is being checked the decade unit 60 is set at "zero" and the decade 58 is set at "ten." This prevents removing the resistor 110 from the circuit.

Thus, by means of the present invention, a novel, rapid and simple method and apparatus for testing the number of turns on magnetic switching units has been provided. The simplified testing method utilizes the characteristics of the magnetic switching unit under test to provide a rapid changing or switching of a predetermined quantum of flux for deriving a standard voltage output for comparison with an unknown voltage output from the winding under test. Thus, only a transformer, a neon lamp and a decade resistance network are necessary for performing accurate reliable counts of the number of turns upon magnetic switching elements.

What is claimed is:

1. In testing means for determining the number of turns in an unknown winding about toroidal magnetic cores, a transformer having a primary coil and a secondary coil, means for connecting the transformer primary coil to a source of power, a glow discharge device connected in a series relationship with the source of power and the primary coil, the glow discharge device being responsive to the source of power to alternately couple intermittent currents of opposite polarity to the primary coil, means for mounting magnetic cores to be tested, a pair of separate conductive windings for connection about the magnetic cores, means for removably connecting the pair of windings in operative position about the cores undergoing test, means for electrically connecting the transformer secondary coil to one of said separate windings, means for electrically connecting the remaining of the separate windings to opposite terminals of a preselected resistance, a multiple section decade resistance network having taps thereon for different ranges of testing, each of the sections providing a different resistance range, means for connecting said unknown winding across the resistance network, means for electrically connecting the preselected resistance in a voltage differential relationship with a portion of the multiple section resistance network of equivalent resistance, and indicating means electrically connected in parallel relationship with the latter mentioned means to detect a voltage null.

2. In testing means for determining the number of turns on an unknown winding of a bistable state magnetic switching element, a power transformer having a primary coil and a secondary coil, means for connecting the transformer primary coil to a source of power, interruptor means connected with the source of power and the primary coil, means for mounting the magnetic element to be tested, means for individually connecting a pair of test windings about the mounted magnetic elements, means electrically connecting one test winding to the transformer secondary coil, means connecting the other test winding to a known impedance, a variable impedance network, means connecting the winding of the mounted magnetic element in parallel relationship with the variable impedance network, means for connecting the known impedance to develop a potential opposite that of a corresponding portion of the impedance network, and indicating means connected to both the latter mentioned impedance means to indicate a null position as the impedance of the network is varied.

3. An arrangement for determining the number of turns in a given coil wound on a ferromagnetic core, comprising: additional coil means effectively linking said core; an exciting circuit including at least a portion of said additional coil means and a source of electrical signals for electromagnetically exciting said core; a reference impedance unit; an adjustable impedance element, coupled across said given coil wound on said core, and made up of a plurality of impedance portions selectable in predetermined combinations to provide any one of a progression of impedance values differing each from the next by equal impedance increments, each such predetermined combination including said reference impedance unit, and said unit having an impedance value equal to an integral number of said impedance increments; connection means for connecting at least a portion of said additional coil means, having a small number of turns, in series relationship with said reference unit in said adjustable impedance element, the sense of the series connection being such that, when said exciting circuit is actuated, the potential appearing across said last-mentioned additional coil is of opposite polarity from that of the portion of the potential induced in said given coil which appears across said reference unit; and a null voltage indicator, coupled across said series-connected combination of said last-mentioned additional coil and said reference unit, to indicate when the selected impedance value of said adjustable impedance element bears the same ratio to the impedance of said reference unit thereof as the number of turns in said given coil bears to the number of turns in said last-mentioned additional coil.

4. An arrangement for determining the number of turns in a given coil wound on a ferromagnetic core, comprising: additional exciting and comparison coils effectively linking said core; an exciting circuit including said exciting coil and a source of electrical signals for electromagnetically exciting said core; a reference impedance unit; an adjustable impedance element, coupled across said given coil wound on said core, and made up of a plurality of impedance portions selectable in predetermined combinations to provide any one of a progression of impedance values differing each from the next by equal impedance increments, each such predetermined combination including said reference impedance unit, and said unit having an impedance value equal to an integral number of said impedance increments; connection means for connecting said comparison coil in series relationship with said reference unit in said adjustable impedance element, the sense of the series connection being such that, when said exciting circuit is actuated, the potential induced in said comparison coil is of opposite polarity from that of the portion of the potential induced in said given coil which appears across said reference unit; and a null voltage indicator, coupled across said series-connected combination of said comparison coil and said reference unit, to indicate when the selected impedance value of said adjustable impedance element bears the same ratio to the impedance of said reference unit thereof as the number of turns in said given coil bears to the number of turns in said comparison coil.

5. An arrangement for determining the number of turns in an unknown winding on the ferromagnetic core of a bistable state magnetic switching element, comprising; additional exciting and comparison coils effectively linking said core; an exciting circuit including said exciting coil and a source of electrical signals for electromagnetically exciting said core at sufficient magnitudes to effect switching thereof alternately between two opposite stable magnetic flux states thereof; a reference impedance unit; an adjustable impedance element, coupled across said unknown winding on said core, and made up of a plurality of impedance portions selectable in predetermined combinations to provide any one of a progression of impedance values differing each from the next by equal impedance increments, each such predetermined combination including said reference impedance unit, and said unit having an impedance value equal to an integral number of said impedance increments; connection means for connecting said comparison coil in series relationship with said reference unit in said adjustable impedance element, the sense of the series connection being such that, when said exciting circuit is actuated, the potential induced in said comparison coil is of opposite polarity from that of the portion of the potential induced in said unknown winding which appears across said reference unit; and a null voltage indicator, coupled across said series-connected combination of said comparison coil and said reference unit, to indicate when the selected impedance value of said adjustable impedance element bears the same ratio to the impedance of said reference unit thereof as the number of turns in said unknown winding bears to the number of turns in said comparison coil.

6. An arrangement for determining the number of turns in an unknown winding on the ferromagnetic core of a bistable state magnetic switching element, comprising: additional exciting and comparison windings effectively linking said core; a source of intermittent electrical pulses, alternating in polarity, coupled to said exciting winding for switching said core rapidly from one flux state approaching saturation to a similar flux state approaching saturation in the opposite sense and alternately back to said one state; a load element coupled to said comparison winding; a reference impedance unit; an adjustable impedance element, coupled across said unknown winding, and made up of a plurality of impedance portions selectable in predetermined combinations to provide any one of a progression of impedance values differing each from the next by equal impedance increments, each such predetermined combination including said reference impedance unit, and said unit having an impedance value equal to an integral number of said impedance increments; connection means for connecting said load element in series relationship with said reference unit in said adjustable impedance element, the sense of the series connections being such that, when said pulses are applied to said exciting winding, the potential induced in said comparison winding and applied to said load element is of opposite polarity from that of the portion of the potential induced in said unknown winding which appears across said reference unit; and a null voltage indicator, coupled across said series-connected combination of said load element and said reference unit, to indicate when the selected impedance value of said adjustable impedance element bears the same ratio to the impedance of said reference unit thereof as the number of turns in said unknown winding bears to the number of turns in said comparison winding.

7. An arrangement for testing a given coil wound on a ferromagnetic core, comprising: a test excitation transformer having a primary winding and a secondary winding; a non-linear electrical circuit element, in series circuit relationship with said primary winding and adapted for coupling said primary winding to a sinusoidal electrical supply source, and responsive to potentials applied from such source to conduct substantial currents in either direction in the primary winding circuit only when the potential across said circuit element exceeds an ionizing potential characteristic of said element; additional coil means effectively linking said ferromagnetic core; an exciting connection from said secondary winding of said excitation transformer to at least a portion of such additional coil means; a reference impedance unit; an adjustable impedance element, coupled across said given coil wound on said core, and made up of a plurality of impedance portions selectable in predetermined combinations to provide any one of a progression of impedance values differing each from the next by equal impedance increments, each such predetermined combination including said reference impedance unit, and said unit having an impedance value equal to an integral number of said impedance increments; connection means for connecting at least a portion of said additional coil means, having a small number of turns, in series relationship with said reference unit in said adjustable impedance element, the sense of the series connection being such that, when said core is excited through said exciting connection from said excitation transformer driven intermittently through said non-linear circuit element, the potential appearing across said last-mentioned additional coil portion is of opposite polarity from that of the portion of the potential induced in said given coil which appears across said reference unit; and a null voltage indicator, coupled across said series-connected combination of said last-mentioned additional coil and said reference unit, to indicate when the selected impedance value of said adjustable element bears the same ratio to the impedance of said reference unit thereof as the number of turns in said given coil bears to the number of turns in said last-mentioned additional coil.

8. An arrangement for determining the number of turns in a coil wound on a closed core of ferromagnetic material, comprising: an exciting circuit including a source of electrical signals for electromagnetically exciting said core; a comparison circuit including a load element of preselected impedance; removable conductor means for linking with the magnetic circuit of said closed core a portion of each of said exciting and comparison circuits, each such portion comprising respective exciting and comparison coils of at least one turn; a reference impedance unit; an adjustable impedance element, coupled across said coil wound on said core, and made up of a plurality of impedance portions selectable in predetermined combinations to provide any one of a progression of impedance values differing each from the next by equal impedance increments, each such predetermined combination including said reference impedance unit, and said unit having an impedance value equal to an integral number of said impedance increments; connection means for connecting said load element in series relationship with said reference unit in said adjustable impedance element, the sense of the series connection being such that, when said exciting circuit is actuated, the potential induced in said comparison coil and applied to said load element is of opposite polarity from that of the portion of the potential induced in said coil wound on said core which appears across said reference unit; and a null voltage indicator, coupled across said series-connected combination of said load element and said reference unit, to indicate when the selected impedance value of said adjustable impedance element bears the same ratio to the impedance of said reference unit thereof as the number of turns in said coil wound on said core bears to the number of turns in said comparison coil.

9. Apparatus for determining the number of turns of an unknown winding on a magnetic core capable of assuming one or the other of two stable states of magnetic remanence and further capable of being switched from either state to the other state, comprising, in combination, coil means adapted to effectively link a core under test, the number of winding turns on which core is to be determined; an exciting circuit including at least a portion of said coil means and a source of electrical signals capable of switching the core under test alternately between its two stable states; a reference impedance unit; an adjustable impedance element adapted to have coupled thereacross the unknown winding on the core and made up of a plurality of impedance portions selectable in predetermined combinations to provide any one of a progression of impedance values differing each from the next by equal impedance increments, each such predetermined combination of the adjustable impedance element including said reference impedance unit; said reference impedance unit having an impedance value equal to an integral number of said impedance increments; means for connecting at least a portion of said coil means in series relationship with said reference unit in said adjustable impedance element, the sense of the series connection being such that when said exciting circuit is actuated the potential appearing across said portion of said coil means is of opposite polarity from that of the potential induced in the unknown winding of the core coupled across said reference unit; and means for coupling a voltage indicator across said series-connected combination of said coil means and said reference unit to indicate when the selected impedance value of said adjustable impedance element bears the same ratio to the impedance of said reference unit thereof as the number of turns in the unknown coil bears to the number of turns in said coil means.

10. Apparatus for determining the number of turns of an unknown widing on a bistable state magnetic switching core comprising, in combination, an exciting winding and a comparison winding adapted to effectively link said core; means for coupling said exciting winding to a source of intermittent electrical pulses alternating in polarity and capable of switching said core from one flux state approaching saturation in one sense to a similar flux state approaching saturation in the opposite sense and alternately back to the first state; a load element coupled to said comparison winding; a reference impedance unit; an adjustable impedance element for coupling across the unknown winding of the core and made up of a plurality of impedance portions selectable in predetermined combinations to provide any one of a progression of impedance values differing each from the next by equal impedance increments, each such predetermined combination of the adjustable impedance element including said reference impedance unit; said reference impedance unit having an impedance value equal to an integral number of said impedance increments; means for connecting said load element in series relationship with said reference unit in said adjustable impedance element, the sense of the series connection being such that, when the pulses from said source of pulses are applied to said exciting winding, the potential induced in said comparison winding and applied to said load element is of opposite polarity from that of the portion of the potential induced in the unknown winding which appears across said reference unit; and voltage indicator means connectable across said series-connected combination of said load element and said reference unit for indicating when the selected impedance value of said adjustable impedance element bears the same ratio to the impedance of said reference unit thereof as the number of turns in the unknown winding on the core bears to the number of turns in said comparison winding.

11. In apparatus for determining the number of turns of an unknown coil wound on a closed core capable of assuming one or the other of two stable states of magnetic remanence and further capable of being switched from either state to the other state; an exciting circuit connectable to a source of electrical signals for switching the core alternately from one to the other of said stable states; a comparison circuit including a load element of pre-selected impedance; removable conductor means for inductively looping a portion of each of said exciting and said comparison circuits about said core, each such portion comprising respective exciting and comparison windings of at least one turn; a reference impedance unit; an adjustable impedance element; means for coupling the adjustable impedance element across said unknown coil on the core, said adjustable impedance element being made up of a plurality of impedance portions selectable in predetermined combinations to provide any one of a progression of impedance values differing each from the next by equal impedance increments; each such predetermined combination of the adjustable impedance element including said reference impedance unit and the latter having an impedance value equal to an integral number of said impedance increments; means for connecting said load element in series relationship with said reference unit in said adjustable impedance element, the sense of the series connection being such that when the exciting circuit receives core switching signals the potential induced in said comparison winding and applied to said load element is of opposite polarity from that of the portion of the potential induced in the unknown coil on the core which appears across said reference unit; and voltage indicator means coupled across said series-connected combination of said load element and said reference unit and operable to indiacte when the selected impedance value of said adjustable impedance element bears the same ratio to the impedance of said reference unit thereof as the number of turns of the unknown coil on said core bears to the number of turns in said comparison winding.

12. In apparatus for testing bistable toroidal magnetic cores in order to determine the number of turns of an unknown winding about the core, a transformer having a primary coil and a secondary coil, means for connecting the transformer primary coil to a source of alternating electrical current and when so connected for providing time spaced pulses of alternately opposite polarities to the primary coil, means for mounting a bistable core to be tested, a pair of sepaarte electrically conductive windings for connection about the magnetic core, means for removably connecting the pair of windings in operative position about the core undergoing test, means for electrically connecting the transformer secondary coil to one of said separate windings, a known electrical resistance element, means for electrically connecting the remaining one of the pair of separate windings to opposite terminals of said resistance element, a multiple section decade resistance network having taps thereon for different ranges of testing, each of the sections providing a different resistance range, means for connecting the unknown winding about the core undergoing test across the resistance network, means for electrically connecting the said resistance element in a voltage differential relationship with a portion of the multiple section resistance network of equivalent resistance, and indicating means electrically connected in parallel relationship with the last mentioned means to detect a voltage null.

13. In testing apparatus for determining the number of turns of an unknown winding about a bistable state magnetic switching core, means for mounting such a bistable magnetic core for testing, means for removably looping a pair of test windings about the mounted magnetic core, means electrically connecting one test winding to a source of time spaced current pulses of alternately opposite polarities each capable of switching the mounted bistable magnetic core undergoing the test, means connecting the other test winding to a known impedance, a variable impedance network, means for connecting the unknown winding of the mounted magnetic core in parallel relationship with the variable impedance network, means for connecting the known impedance to develop a potential opposite that of a corresponding portion of the impedance network, and indicating means connected to both the latter mentioned impedance means to indicate a null position as the impedance of the network is varied.

References Cited in the file of this patent

UNITED STATES PATENTS

| | | |
|---|---|---|
| 1,487,615 | St. Clair et al. | Mar. 18, 1924 |
| 2,432,948 | Thompson | Dec. 16, 1947 |
| 2,540,398 | Lesniak | Feb. 6, 1951 |
| 2,680,835 | Smith | June 8, 1954 |
| 2,711,509 | Endres et al. | June 21, 1955 |